(12) United States Patent
Taira et al.

(10) Patent No.: US 10,844,237 B2
(45) Date of Patent: Nov. 24, 2020

(54) INK JET RECORDING METHOD AND INK JET RECORDING APPARATUS

(71) Applicant: CANON KABUSHIKI KAISHA, Tokyo (JP)

(72) Inventors: Yoko Taira, Yokohama (JP); Masayuki Ikegami, Atsugi (JP); Yuhei Shimizu, Kawasaki (JP); Akira Kuriyama, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/681,669

(22) Filed: Nov. 12, 2019

(65) Prior Publication Data

US 2020/0079968 A1    Mar. 12, 2020

Related U.S. Application Data

(63) Continuation of application No. PCT/JP2018/018046, filed on May 10, 2018.

(30) Foreign Application Priority Data

May 17, 2017  (JP) ................................. 2017-098239
Apr. 13, 2018  (JP) ................................. 2018-077805

(51) Int. Cl.

| C09D 11/40 | (2014.01) |
| C09D 11/52 | (2014.01) |
| C09D 11/322 | (2014.01) |
| C09D 11/328 | (2014.01) |
| C09D 11/36 | (2014.01) |

(Continued)

(52) U.S. Cl.
CPC .......... *C09D 11/40* (2013.01); *B41M 5/0023* (2013.01); *C09B 47/20* (2013.01); *C09B 47/24* (2013.01); *C09B 56/16* (2013.01); *C09D 11/033* (2013.01); *C09D 11/037* (2013.01); *C09D 11/322* (2013.01); *C09D 11/328* (2013.01); *C09D 11/36* (2013.01); *C09D 11/52* (2013.01)

(58) Field of Classification Search
CPC ..... C09D 11/40; C09D 11/033; C09D 11/037; C09D 11/322; C09D 11/328; C09D 11/36; C09D 11/52; C09B 56/16; C09B 47/20; C09B 47/24; B41M 5/0023
See application file for complete search history.

(56) References Cited

U.S. PATENT DOCUMENTS 8,529,043 B2 *  9/2013  Kakutani ............... B41J 2/2107
                                                                347/100

FOREIGN PATENT DOCUMENTS

| JP | 10-306221 A | 11/1998 |
| JP | 2003-231834 A | 8/2003 |

(Continued)

*Primary Examiner* — Thinh H Nguyen
(74) *Attorney, Agent, or Firm* — Canon U.S.A., Inc. IP Division

(57) ABSTRACT

An ink jet recording method including the steps of a first recording step for applying a first ink to a recording medium and a second recording step for applying a second ink to the recording medium so as to overlap at least a region provided with the first ink, wherein the first ink is an aqueous ink containing silver particles, the second ink is an aqueous ink containing a dye, a time difference between applications of the first ink and the second ink to the recording medium is 1 sec or more to 7,200 sec or less, and the dye is a predetermined dye.

9 Claims, 3 Drawing Sheets

(51) Int. Cl.
*B41M 5/00* (2006.01)
*C09D 11/037* (2014.01)
*C09B 47/20* (2006.01)
*C09B 47/24* (2006.01)
*C09B 56/16* (2006.01)
*C09D 11/033* (2014.01)

(56) References Cited

FOREIGN PATENT DOCUMENTS

| | | | |
|---|---|---|---|
| JP | 2003-321627 A | 11/2003 |
| JP | 2004-285106 A | 10/2004 |
| JP | 2005-139427 A | 6/2005 |
| JP | 2006-143989 A | 6/2006 |
| JP | 2008-161751 A | 7/2008 |
| JP | 2009-136845 A | 6/2009 |
| JP | 2012-121279 A | 6/2012 |
| JP | 2012-206479 A | 10/2012 |
| JP | 2012-206481 A | 10/2012 |
| JP | 2013-52654 A | 3/2013 |
| JP | 2015-193127 A | 11/2015 |
| WO | 2006/082669 A1 | 8/2006 |
| WO | 2006/112031 A1 | 10/2006 |
| WO | 2007/091631 A1 | 8/2007 |
| WO | 2008/049519 A1 | 5/2008 |
| WO | 2008/131164 A2 | 10/2008 |
| WO | 2012/014954 A1 | 2/2012 |
| WO | 2012/081640 A1 | 6/2012 |

\* cited by examiner

INK JET RECORDING METHOD AND INK JET RECORDING APPARATUS

CROSS-REFERENCE TO RELATED APPLICATIONS

This application is a Continuation of International Patent Application No. PCT/JP2018/018046, filed May 10, 2018, which claims the benefit of Japanese Patent Application No. 2017-098239, filed May 17, 2017 and No. 2018-077805, filed Apr. 13, 2018, both of which are hereby incorporated by reference herein in their entirety.

TECHNICAL FIELD

The present invention relates to an ink jet recording method and an ink jet recording apparatus.

BACKGROUND ART

Ink containing metal particles has been used to form an electric circuit by exploiting the characteristics of the metal particles used and, in recent years, has also been applied to, for example, Christmas greeting cards having a metallic appearance. In particular, it is desirable to record a color image having a metallic appearance (hereafter also referred to as a "color metallic image") to enhance decorativeness of a color image. For the purpose of recording a color metallic image, an ink jet recording method in which an ink containing an pigment is applied to a region provided with an ink containing silver particles has been proposed (refer to Japanese Patent Laid-Open No. 2013-52654). In addition, there has also been proposed an ink jet recording method in which a treatment agent is applied to a recording medium and an ink containing a dye and an ink containing silver particles are applied in this order to the region provided with the treatment agent so as to overlay one ink on another (refer to Japanese Patent Laid-Open No. 2015-193127). Further, an ink jet recording method in which an ink containing silver particles and an ink containing a dye are applied in this order so as to overlay one ink on another has been proposed (refer to International Publication No. 2006/112031).

To obtain a color metallic image having excellent color developability, the present inventors recorded an image by using the similar method as the ink jet recording method described in Japanese Patent Laid-Open No. 2013-52654 except that the ink containing a pigment was changed to the ink containing a dye described in Japanese Patent Laid-Open No. 2015-193127. As a result, it was found that neither glossiness nor color developability of the image was realized. Further, when an image was recorded by using the same method as the ink jet recording method described in International Publication No. 2006/112031, it was found that the color developability of the image was not realized.

Accordingly, it is an object of the present invention to provide an ink jet recording method which is excellent in image glossiness and color developability. In addition, it is another object of the present invention to provide an ink jet recording apparatus in which the ink jet recording method is adopted.

SUMMARY OF INVENTION

The above-described objects are addressed by the present invention described below. That is, the present invention relates to an ink jet recording method including the steps of a first recording step for applying a first ink to a recording medium and a second recording step for applying a second ink to the recording medium so as to overlap at least a region provided with the first ink, wherein the first ink is an aqueous ink containing silver particles, the second ink is an aqueous ink containing a dye, a time difference between applications of the first ink and the second ink to the recording medium is 1 sec or more to 7,200 sec or less, and the intermolecular distance d-value of the dye measured by a small-angle X-ray scattering method is 5.9 nm or more, and the ratio of the peak area to the peak area of C.I. Acid Red 249 is 1.1 times or more.

In addition, the present invention relates to an ink jet recording apparatus including a device to apply a second ink after a first ink is applied, wherein the first ink is an aqueous ink containing silver particles, the second ink is an aqueous ink containing a dye, a time difference between applications of the first ink and the second ink to the recording medium is 1 sec or more to 7,200 sec or less, and the intermolecular distance d-value of the dye measured by a small-angle X-ray scattering method is 5.9 nm or more, and, in addition, the ratio of the peak area to the peak area of C.I. Acid Red 249 is 1.1 times or more.

Further features of the present invention will become apparent from the following description of exemplary embodiments with reference to the attached drawings.

DESCRIPTION OF EMBODIMENTS

Figure 1A:
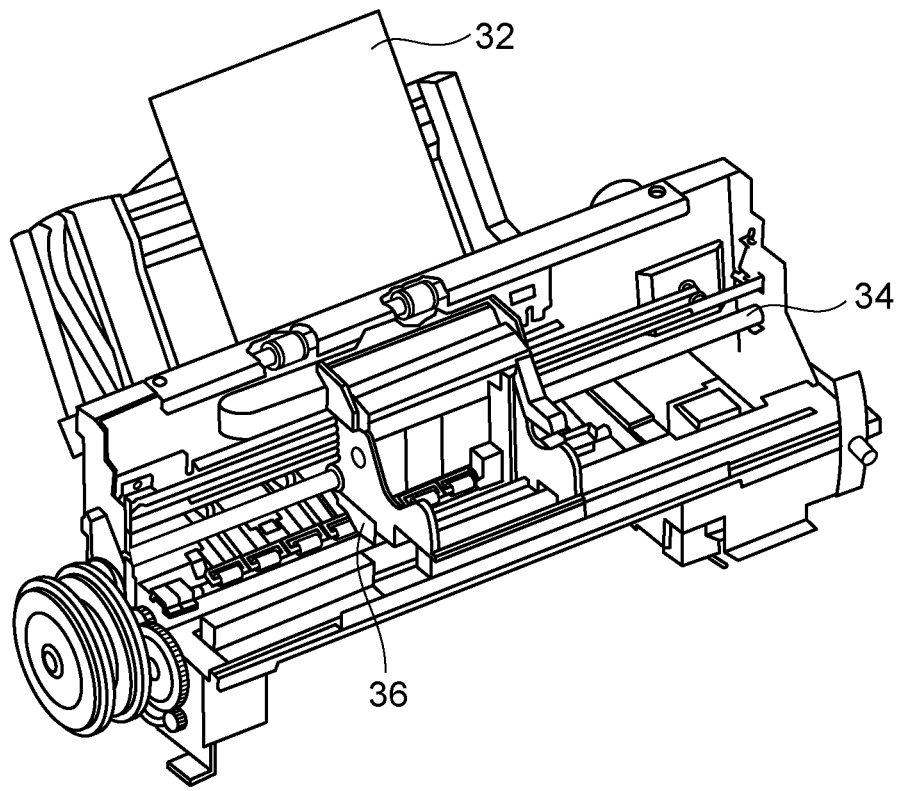
FIG. 1A is a schematic diagram showing an example of an ink jet recording apparatus used in an ink jet recording method according to the present invention and is a perspective view of a main portion of the ink jet recording apparatus.

The embodiments according to the present invention will be described below in detail. Various physical property values are values at a temperature of 25° C. unless otherwise specified. Regular reflection light refers to the light reflected in the opposite direction at the same angle as the angle of the light incident on an image in the same manner as a mirror. For example, when light is incident on an image in the 45-degree direction, the light reflected at an angle of the same 45 degrees relative to the image is the regular reflection light. In the present invention, an image having color developability refers to an image that enables the regular reflection light reflected on the image to have a color tone of a coloring material used.

Examples of the method for recording an image having excellent color developability include a method in which an achromatic metal layer having no chroma and a coloring material layer are formed successively on a recording medium. Accordingly, the light incident on the coloring material layer is reflected on the metal layer and passes through the coloring material layer again so as to be recognized as a color metallic image having the color tone of the coloring material used. When a method in which the coloring material layer is formed on the recording medium and the metal layer is formed thereafter is used, the incident light is reflected on the metal layer. Therefore, the light does not readily pass through the coloring material layer and is not recognized as an image having the color tone of the coloring material used.

Further, to record an image having excellent color developability, a coloring material having high chroma has to be used. Meanwhile, to record an image having excellent glossiness, the light reflectivity of the metal layer has to be high.

Accordingly, to form a silver layer having higher light reflectivity than other metal layers, the present inventors used an ink containing silver particles as the ink that constituted a metal layer and used an ink containing a dye having higher chroma than pigments as the ink that constituted the coloring material layer. However, it was found that even when the ink containing silver particles was applied to the recording medium, and, thereafter, the ink containing the dye was applied to the recording medium so as to overlap at least the region provided with the ink containing silver particles, color developability of the image was not realized.

The image was analyzed, and it was found that the silver particle layer had several nanometers of pores, and the liquid component of the second ink and the dye entered the pores and further permeated to the recording medium. Consequently, it was found that the silver layer colored with the dye was not formed on the recording medium, and color developability of the image was not realized.

Then, to improve the color developability of the image, a second ink containing an easy-to-aggregate dye was used. The present inventors performed research on the dye that satisfied the condition of "easy-to-aggregate". As a result, it was found that regarding the dye to be used, the intermolecular distance d-value measured by a small-angle X-ray scattering method had to be 5.9 nm or more, and the ratio of the peak area to the peak area of C.I. Acid Red 249 had to be 1.1 times or more. Since such a dye has strong intermolecular forces in a liquid, the dye is in a molecular association state, and aggregation readily occurs in accordance with evaporation of water. Since the dye in the second ink aggregates rapidly in accordance with evaporation of water in the second ink attached to the recording medium, the dye does not pass through the silver layer smoothly and is further suppressed from permeating to the recording medium. It is considered that the silver layer colored with the dye could be formed and that the color developability of the image was improved for the above-described reason.

However, it was clarified that, in some cases, glossiness of the image was not realized even though the silver layer colored with the dye could be formed. Regarding the silver layer colored with the dye, some dye was retained on the surface of the silver layer, and some dye entered the silver layer. In particular, it was clarified that when the dye entered the silver layer, glossiness of the image was not realized. The cause of this was further researched. As a result, it was found that the following conditions had to be satisfied in addition to using the easy-to-aggregate dye with silver particles. That is, it is necessary to set a time difference between the application of the first ink containing silver particles and the second ink containing an easy-to-aggregate dye to the recording medium to be 1 sec or more. The glossiness of the image can be thereby improved for the reason described below.

In general, in the case in which silver particles are used for forming an electric circuit, the ink containing silver particles is applied to the substrate, heating is performed at a high temperature of about 200° C. to 400° C., and, thereby, silver particles aggregate due to evaporation of the liquid component. However, in the case in which an image is recorded on a recording medium having permeability, for example, plain paper or glossy paper, heating of the recording medium is unnecessary because silver particles approach each other so as to aggregate due to permeation of the liquid component.

In an ink jet aqueous ink, particles having particle diameters of several to several hundred nanometers are used in consideration of ejection stability. In particular, metal particles having a small particle diameter, for example, silver particles, exhibit a characteristic property of surface plasmon resonance. Surface plasmon resonance will be described. When light is applied to nano-size silver particles, free electrons of silver are oscillated, resulting in the occurrence of polarization (plasmons). Plasmons may resonate with light having a specific wavelength, and when the light having such a wavelength resonates with plasmons (surface plasmon resonance), the light is absorbed by silver particles. Consequently, silver particles having small particle diameters may appear to be colored. Since silver particles absorb light having a wavelength of about 400 nm in accordance with the particle diameter and shape, silver particles seem to take on a yellow to brown appearance.

Silver in the silver layer formed by aggregation of silver particles does not have the properties of the above-described particles having a particle diameter of several nanometers to several hundred nanometers. Therefore, surface plasmon resonance does not readily occur. Consequently, the silver layer is not readily colored other than silver and has a metallic appearance so as to enable an image having glossiness to be obtained.

To form a silver layer on the recording medium, it is necessary that the permeation time of the liquid component of the first ink and the time for aggregation of silver particles after permeation be ensured. As a result of research by the present inventors, it was found that the time required from application of the first ink to the recording medium to formation of the silver layer on the recording medium was about 1 sec.

If the time difference between the application of the first ink containing silver particles and the second ink containing an easy-to-aggregate dye to the recording medium is less than 1 sec, the second ink is applied before the silver particles in the first ink attached to the recording medium aggregate. Consequently, aggregation of the silver particles is suppressed by the dye in the second ink, dye aggregates are present between the silver particles, and aggregation of the silver particles becomes insufficient. As a result, the formed silver layer is in the state of including the dye and in the state in which coloring by the interposing dye and coloring due to the surface plasmon resonance of the silver particles that do not aggregate are combined. Therefore, glossiness is not realized and the image is dark. If the time difference between the application of the first ink containing silver particles and the second ink containing an easy-to-aggregate dye to the recording medium is 1 sec or more, the second ink is applied after aggregation of the silver particles in the first ink attached to the recording medium. Consequently, since dye aggregates can remain on the surface of the formed silver layer, glossiness is realized and the image is bright.

In addition, as a result of research by the present inventors, it was found that in the case in which the time difference was more than 7,200 sec, the silver layer colored with the dye was not formed, the dye permeated to the recording medium, and the color developability of the image was not realized. In this regard, to form the silver layer colored with the dye, the present inventors noted the permeation of the liquid component of the second ink into the recording medium. Evaporation of water in the second ink is facilitated and the dye is likely to aggregate by retarding permeation of the second ink into the silver layer. Consequently, the dye does not readily pass through pores in the silver layer and does not readily permeate to the recording medium. Therefore, the silver layer colored with the dye is formed, and the color developability of the image is improved.

Permeation of the second ink into the silver layer is controlled by exploiting the liquid component of the first ink applied earlier. The second ink is applied while the liquid component of the first ink remains in the vicinity of the surface of the recording medium, and, thereby, permeation of the second ink is suppressed by the liquid component of the first ink and becomes retarded.

When the time difference is more than 7,200 sec, the liquid component of the first ink that remains in the vicinity of the surface of the recording medium cannot retard permeation of the second ink sufficiently due to evaporation and permeation. Consequently, the dye in the second ink permeates to the recording medium through the silver layer, and the color developability of the image is not realized.

That is, in the present invention, the time difference being 7,200 sec refers to the time period in which the liquid component of the first ink remains in the vicinity of the surface of the recording medium and refers to the time period in which permeation of the second ink into the silver layer can be suppressed.

The present inventors found that setting the time difference to be within a predetermined range suppressed permeation of the second ink, enabled the dye to effectively remain on the surface of the silver layer, and enabled the compatibility between the color developability and the glossiness of the image to be ensured.

Ink Jet Recording Method

The ink jet recording method according to the present invention is an ink jet recording method including the steps of a first recording step for applying a first ink to a recording medium and a second recording step for applying a second ink to the recording medium so as to overlap at least a region provided with the first ink.

In the recording step, preferably, an image is recorded by ejecting an ink from a recording head of an ink jet system. Examples of the system for ejecting the ink include a system in which mechanical energy is applied to the ink and a system in which thermal energy is applied to the ink. In the present invention, it is preferable that the system in which an ink is ejected by applying thermal energy to the ink be adopted. In this regard, in the ink jet recording method according to the present invention, it is unnecessary to apply active energy rays.

Figure 1B:
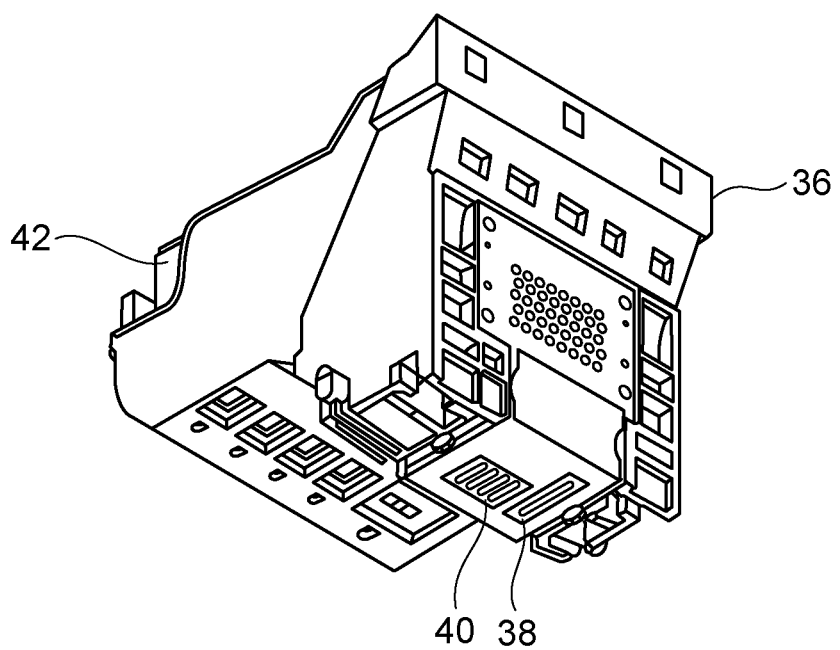
FIG. 1B is a schematic diagram showing an example of an ink jet recording apparatus used in an ink jet recording method according to the present invention and is a perspective view of a head cartridge.

FIG. 1A and FIG. 1B are schematic diagrams showing an example of an ink jet recording apparatus used in the ink jet recording method according to the present invention, FIG. 1A is a perspective view of a key portion of the ink jet recording apparatus, and FIG. 1B is a perspective view of a head cartridge. The ink jet recording apparatus includes a conveyance unit (not shown in the drawing) to convey a recording medium 32 and a carriage shaft 34. A head cartridge 36 is mountable on the carriage shaft 34. The head cartridge 36 includes recording heads 38 and 40 and is configured to be set with an ink cartridge 42. An ink (not shown in the drawing) is ejected from the recording heads 38 and 40 toward the recording medium 32 while the head cartridge 36 is conveyed along the carriage shaft 34 in the main scanning direction. Then, the recording medium 32 is conveyed in the sub-scanning direction by the conveyance unit (not shown in the drawing), and, as a result, an image is recorded on the recording medium 32.

In the ink jet recording method according to the present invention, the time difference between the applications of the first ink and the second ink to the recording medium is set to be 1 sec or more to 7,200 sec or less. When a serial system in which an image is recorded by moving the recording head in the main scanning direction is adopted, examples of the method for applying the first ink and the second ink with a time difference to the recording medium include methods in which an image is recorded in one direction, as described in (1) to (3) below. In this regard, an image may be recorded in both directions provided that two types of inks can be applied with a time difference to the recording medium.

(1) A recording head having ejection orifice lines of the first ink and ejection orifice lines of the second ink that are arranged in the direction orthogonal to the main scanning direction is used. A method in which the first ink is applied to a unit region of the recording medium, and, thereafter, the second ink is applied to the unit region without conveying the recording medium.

(2) A recording head having ejection orifice lines of the first ink and ejection orifice lines of the second ink that are arranged in the direction orthogonal to the main scanning direction is used. A method in which the first ink uses some upstream-side ejection orifice lines in the sub-scanning direction, the second ink uses some downstream-side ejection orifice lines in the sub-scanning direction, and the first ink and the second ink are applied to the unit region while the recording medium is conveyed.

(3) A recording head having ejection orifice lines of the first ink on the upstream side of the sub-scanning direction and ejection orifice lines of the second ink on the downstream side of the sub-scanning direction is used. A method in which the first ink uses some upstream-side ejection orifice lines, the second ink uses some downstream-side ejection orifice lines, and the first ink and the second ink are applied with a time difference corresponding to at least a conveyance time of the recording medium while the recording medium is conveyed.

First Ink

The first ink is an aqueous ink containing silver particles. The components constituting the first ink will be described below.

Silver Particles

Each silver particle is composed of silver atoms. The silver particle may be configured to contain, in addition to silver atoms, other metal atoms, oxygen atoms, sulfur atoms, carbon atoms, and the like. However, the proportion (%) of the silver atoms in the silver particle is preferably 50.0% by mass or more.

Examples of the method for producing silver particles include a method in which silver lumps are pulverized by a pulverizer such as a ball mill or a jet mill (pulverization method) and a method in which silver ions or silver complexes are reduced by a reducing agent so as to aggregate (reduction method). In the present invention, it is preferable that silver particles be produced by the reduction method from the viewpoint of ease of particle diameter control of the silver particles and dispersion stability of the silver particles.

Particle Diameter at Cumulative Volume of 50% ($D_{50}$) of Silver Particles

The particle diameter at a cumulative volume of 50% of silver particles refers to a particle diameter when the volume of silver particles is accumulated from the small diameter side and reaches 50% with reference to the total volume of measured silver particles in a particle diameter cumulative curve. The particle diameter at a cumulative volume of 50% (nm) of the silver particles is preferably 200 nm or less. When $D_{50}$ is 200 nm or less, since the particle diameters of the silver particles are small, the silver particles are likely to aggregate with nearby silver particles. Consequently, the proportion of silver particle aggregates in the silver layer increases, and the glossiness of the image is further improved. The particle diameter at a cumulative volume of 50% (nm) of the silver particles is preferably 1 nm or more to 100 nm or less and more preferably 10 nm or more to 100 nm or less. $D_{50}$ is measured by a dynamic light scattering method.

Method for Dispersing Silver Particles

Examples of the method for dispersing silver particles include a surfactant-dispersion type in which a surfactant is used as a dispersant and a resin-dispersion type in which a resin is used as a dispersant. As a matter of course, in the first ink, silver particles which are different in the dispersion method may be used in combination.

Regarding the surfactant used as the dispersant in the surfactant-dispersion type, anionic surfactants, nonionic surfactants, cationic surfactants, and amphoteric surfactants may be used. Examples of the anionic surfactant include fatty acid salts, alkyl sulfuric acid ester salts, alkyl aryl sulfonic acid salts, alkyl diaryl ether disulfonic acid salts, dialkyl sulfosuccinic acid salts, alkyl phosphoric acid salts, naphthalene sulfonic acid formalin condensates, polyoxyethylene alkyl ether sulfuric acid salts, polyoxyethylene alkyl phosphoric acid ester salts, and glycerol borate fatty acid esters. Examples of nonionic surfactant include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-based compounds, and silicone-based compounds. Examples of the cationic surfactant include alkylamine salts, quaternary ammonium salts, alkylpyridinium salts, and alkylimidazolium salts. Examples of the amphoteric surfactant include alkylamine oxides and phosphatidylcholine.

Of these, it is preferable that the surfactant be at least one selected from anionic surfactants and nonionic surfactants. Preferably, the anionic surfactant is a polyoxyethylene alkyl ether sulfuric acid salt. Preferably, the nonionic surfactant is a polyoxyethylene alkyl ether.

Preferably, the resin used as the dispersant in the resin dispersion type has both a hydrophilic section and a hydrophobic section. Examples of the resin include polyvinyl-based resins, polyester-based resins, amino-based resins, acrylic resins, epoxy-based resins, polyurethane-based resins, polyether-based resins, polyamide-based resins, unsaturated-polyester-based resins, phenol-based resins, silicone-based resins, and fluoropolymer compounds.

The weight average molecular weight (Mw) obtained by gel permeation chromatography (GPC) of the resin in terms of polystyrene is preferably 1,000 or more to 100,000 or less and further preferably 3,000 or more to 50,000 or less.

The content (% by mass) of the dispersant in the first ink is preferably 1.0 time or less the content (% by mass) of silver particles on a mass ratio (times) basis. If the mass ratio is more than 1.0 time, an excessive amount of dispersant is present relative to silver particles, the silver particles do not readily approach each other, and the silver particles do not readily aggregate with each other. Consequently, the glossiness of the image is not limited to be realized sufficiently. The mass ratio is further preferably 0.1 times or more. If the mass ratio is less than 0.1 times, the amount of dispersant is excessively small relative to silver particles in the first ink, and the silver particles are not stably dispersed in the first ink. Consequently, the ejection stability of the ink is not limited to be sufficiently realized.

The content (% by mass) of the silver particles in the first ink is preferably 2.0% by mass or more to 15.0% by mass or less relative to the total mass of the first ink. If the content is less than 2.0% by mass, since the amount of silver particles is excessively small, the silver layer is not readily formed on the recording medium, and the glossiness of the image is not limited to be realized sufficiently. If the content is more than 15.0% by mass, the amount of silver particles is excessive. Therefore, in the case in which the recording head has a heat generation portion to eject the ink, silver particles are likely to adhere to the heat generation portion. Consequently, bubble generation energy applied to the ink increases, and the ejection stability of the ink is not limited to be sufficiently realized. The content (% by mass) of the silver particles in the first ink is further preferably 2.0% by mass or more to 8.0% by mass or less relative to the total mass of the first ink.

Surfactant

Preferably, the first ink further contains a surfactant different from the surfactant that may be used as a dispersant for silver particles. Regarding the surfactant, an anionic surfactant, a nonionic surfactant, a cationic surfactant, an amphoteric surfactant, or the like may be used. Of these, it is preferable that the surfactant be a nonionic surfactant. Examples of the nonionic surfactant include an acetylene glycol ethylene oxide adduct. In particular, the nonionic surfactant has an HLB value based on the Griffin method of preferably 10 or more. If the HLB value is less than 10, hydrophobicity is high and dissolution into the first ink does not likely to occur. In this regard, the HLB value based on the Griffin method is calculated from the formula weight of the ethylene oxide group in the surfactant and the molecular weight of the surfactant by using the formula, HLB value=20×(formula weight of ethylene oxide group in surfactant)/(molecular weight of surfactant). The HLB value expresses the degree of hydrophilicity or lipophilicity of a surfactant (compound) in the range of 0 to 20. A lower HLB value indicates that the compound has higher lipophilicity (hydrophobicity). On the other hand, a higher HLB value indicates that the compound has higher hydrophilicity.

In the first ink, the content (% by mass) of the surfactant used as the dispersant of silver particles is preferably 2.0% by mass or more to 7.0% by mass or less. In the first ink, the content (% by mass) of the surfactant other than the surfactant used as the dispersant of silver particles is preferably 0.1% by mass or more to 1.0% by mass or less.

Aqueous Medium

The first ink contains water or an aqueous medium that is a mixed solvent of water and water-soluble organic solvent. Preferably, deionized water (ion-exchanged water) is used as the water. There is no particular limitation regarding the water-soluble organic solvent, and any of alcohols, glycols, glycol ethers, nitrogen-containing compounds, and the like that can be used for an ink-jet ink may be used. Usually, a "water-soluble organic solvent" refers to a liquid. However, the present invention includes water-soluble organic solvents that are solid at a temperature of 25° C. At least one of these water-soluble organic solvents may be contained in the ink.

The polyhydric alcohol in the present invention is a compound in which at least two hydrogen atoms of a saturated hydrocarbon (alkane) are substituted with hydroxy groups. Of these, it is preferable that a polyhydric alcohol of trivalence or more to hexavalence or less be used as the water-soluble organic solvent. The polyhydric alcohol of trivalence or more has many hydroxy groups capable of forming hydrogen bonds with water. Consequently, when the second ink is applied so as to overlap at least the region provided with the first ink, the liquid component of the second ink forms hydrogen bonds with hydroxy groups included in the polyhydric alcohol in the first ink. Therefore, permeation of the liquid component of the second ink is suppressed, and a silver layer colored with the dye can be formed. As a result, the color developability of the image is further improved.

Examples of the polyhydric alcohol of trivalence include glycerin and trimethylol propane. Examples of the polyhydric alcohol of tetravalence include erythritol. Examples of the polyhydric alcohol of pentavalence include xylitol and D-glucose. Examples of the polyhydric alcohol of hexavalence include sorbitol.

Of these, it is preferable that the polyhydric alcohol be a pentahydric or hexahydric sugar alcohol. The sugar alcohol is one type of sugars which are produced by reducing carbonyl groups of aldose or ketose. The pentahydric or hexahydric sugar alcohol have many hydroxy groups capable of forming hydrogen bonds with a liquid component and can efficiently form hydrogen bonds with water because hydroxy groups are bonded to carbon atoms at both terminals of the main chain. Consequently, a silver layer colored with the dye can be formed, and the color developability of the image is further improved. Examples of the pentahydric or hexahydric sugar alcohol include xylitol and sorbitol.

The carbon number of the polyhydric alcohol is preferably 3 or more to 7 or less and further preferably 5 or 6.

The content (% by mass) of the water in the first ink is preferably 50.0% by mass or more to 95.0% by mass or less relative to the total mass of the ink. Meanwhile, the content (% by mass) of the water-soluble organic solvent in the first ink is preferably 3.0% by mass or more to 50.0% by mass or less relative to the total mass of the first ink. In the case in which the polyhydric alcohols of trivalence or more to hexavalence or less are used, the above-described content is the value including the polyhydric alcohols of trivalence or more to hexavalence or less. If the content of the water-soluble organic solvent is less than 3.0% by mass, when the first ink is used for an ink jet recording apparatus, the reliability, for example, sticking resistance, is not limited to be sufficiently realized. Meanwhile, if the content of the water-soluble organic solvent is more than 50.0% by mass, the viscosity of the ink increases, and poor supply of the ink may occur. In addition, the content (% by mass) of the polyhydric alcohols of trivalence or more to hexavalence or less in the ink is preferably 3.0% by mass or more to 30.0% by mass or less relative to the total mass of the first ink and further preferably 5.0% by mass or more to 20.0% by mass or less.

Other Components

The ink may contain various additives, for example, a pH adjuster, a defoaming agent, a rust inhibitor, a preservative, a fungicide, an antioxidant, a reducing inhibitor, and a chelating agent, as the situation demands.

Physical Properties of First Ink

The viscosity (mPa·s) at a temperature of 25° C. of the first ink is preferably 1 mPa·s or more to 5 mPa·s or less and further preferably 1 mPa·s or more to 3 mPa·s or less. In addition, the surface tension (mN/m) at a temperature of 25° C. of the ink is preferably 10 mN/m or more to 60 mN/m or less, more preferably 20 mN/m or more to 60 mN/m or less, and further preferably 30 mN/m or more to 40 mN/m or less. The surface tension of the ink may be adjusted by appropriately determining the type and the content of the surfactant in the ink.

Second Ink

The second ink is an aqueous ink containing a dye. The components constituting the second ink will be described below.

Dye

Regarding the dye, a dye having an intermolecular distance d-value measured by a small-angle X-ray scattering method is 5.9 nm or more and having the ratio of the peak area to the peak area of C.I. Acid Red 249 is 1.1 times or more is used. When the intermolecular distance d-value and the peak area were determined by the small-angle X-ray scattering method, to set the molecular density in the solution to be constant, a liquid in which the content of the dye was set to be constant and which contained 5.0% by mass of dye was used. If the content of the dye in the liquid increases, the intermolecular distance of the dye decreases, and aggregation may readily occur. Therefore, the liquid having a low dye content of 5.0% by mass was subjected to the measurement.

Meanwhile, C.I. Acid Red 249 serving as the reference of the peak area is a compact molecule and is a hard-to aggregate dye. Even though the time difference between the application of the first ink containing silver particles and the second ink containing C.I. Acid Red 249 to the recording medium is set to be 120 sec that is within the predetermined range, the dye is not likely to aggregate, and the color developability is degraded to an unacceptable level. Since C.I. Acid Red 249 is set to be the reference of the peak area, whether the dye is easy-to-aggregate compared with C.I. Acid Red 249 can be determined.

The dye specified on the basis of two indicators determined by the small-angle X-ray scattering method has a strong intermolecular force of the dye in the liquid. Therefore, the dye is likely to aggregate. The two indicators determined by the small-angle X-ray scattering method will be described below in detail.

The small-angle X-ray scattering method is described in "Saishin Koroido Kagaku (New Colloid Chemistry)" (Kodansha Scientific, Ltd., F. Kitahara and K. Furusawa) and "Hyoumenjoutai to Koroidojoutai (Surface State and Colloidal State)" (Tokyo chemistry coterie, M. Nakagaki). This method has been commonly used for calculating the distance between colloidal particles in a colloidal solution.

Figure 2:
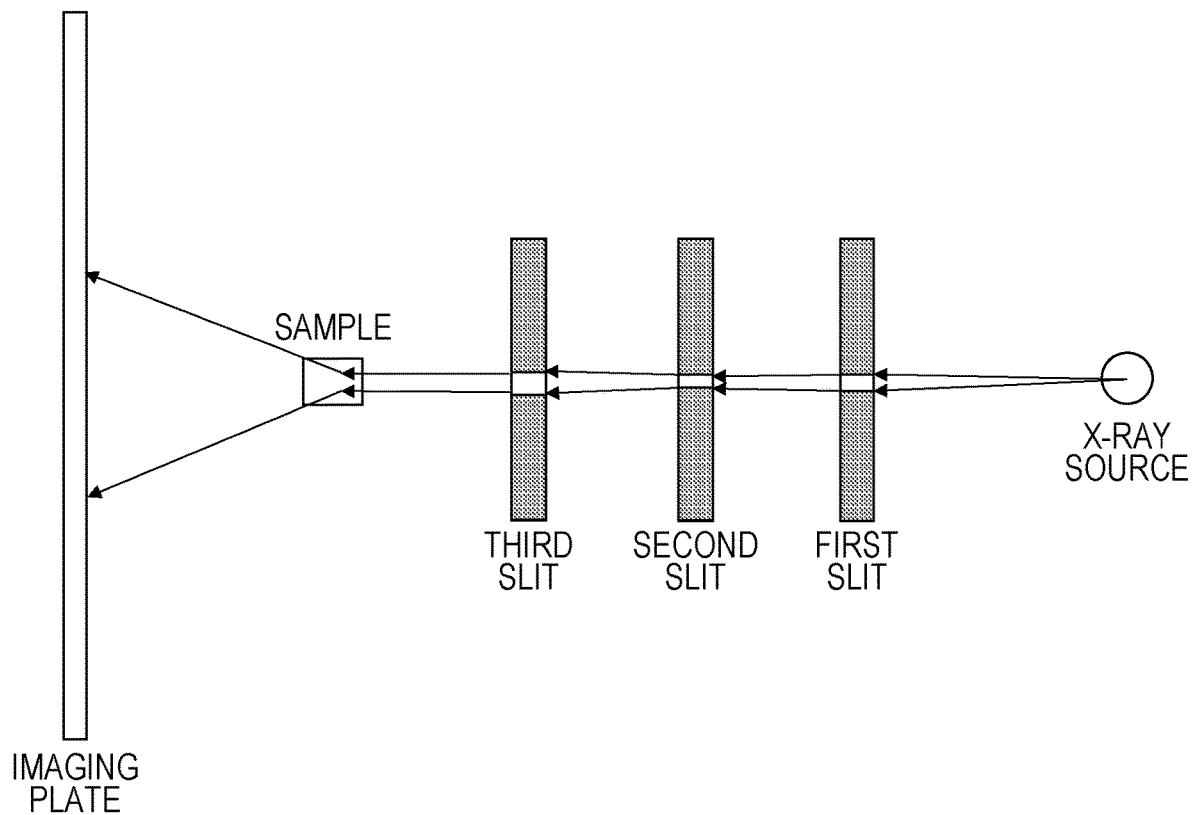
FIG. 2 is a principle diagram of a small-angle X-ray scattering measurement.

FIG. 2 is a principle diagram of a small-angle X-ray scattering measurement. X-rays generated from an X-ray source are passed through first to third slits so as to concentrate the focal point size to about several millimeters or less and are applied to a sample solution. The applied X-rays are scattered by particles in the solution and, thereafter, are detected on an imaging plate behind the sample. The resulting two-dimensional data are converted to a one-dimensional profile by exploiting circular average. The background is formed by employing a Spline function and is subtracted from the measured value. A peak and the integral are calculated by using analysis software so as to obtain a scattering angle profile. The vertical axis of the scattering angle profile indicates the X-ray scattering intensity, and the horizontal axis indicates the scattering angle 2θ. Since the X-ray scattering intensity changes in accordance with the 2θ value, the X-ray scattering intensity has the maximum at some 2θ value. The intermolecular distance d-value is determined on the basis of the Bragg equation (2 d sin θ=nλ, λ: X-ray wavelength, d: distance between particles, and θ: scattering angle) by using the 2θ value at which the X-ray scattering intensity becomes the maximum. The resulting d-value was taken as the indicator that determined aggregation tendency of the dye. It is considered that the d-value calculated here is a center-to-center distance of molecules aligned at a regular interval.

Provided that an aggregate formed by dye aggregation in the liquid is a "dye molecular aggregate", the d-value is a center-to-center distance of dye molecular aggregates. The relationship between the d-value and the aggregation tendency of the dye will be described with reference to FIG. 3.

Figure 3A:
FIG. 3A is a conceptual diagram of the d-value of a dye molecular aggregate and is a conceptual diagram of the d-value in the case in which the dye molecular aggregate is small.
Figure 3B:
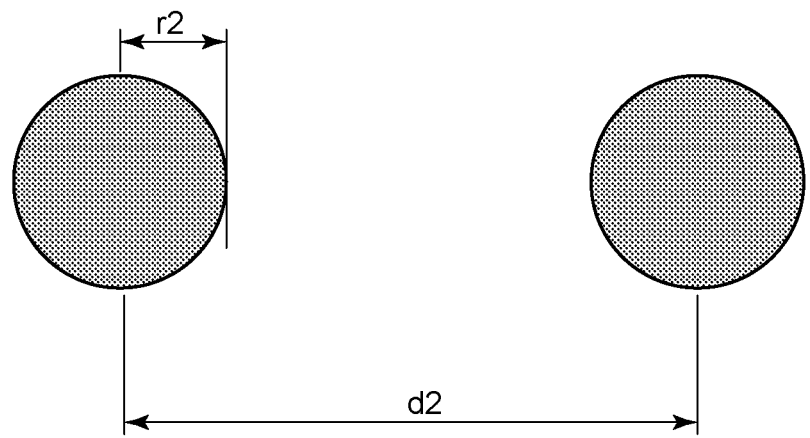
FIG. 3B is a conceptual diagram of the d-value of a dye molecular aggregate and is a conceptual diagram of the d-value in the case in which the dye molecular aggregate is large.

FIGS. 3A and 3B are conceptual diagrams of the d-value of a dye molecular aggregate. In FIG. 3A, the radius of a dye molecular aggregate is represented as r1, and the center-to-center distance of molecular aggregates is represented as d1.

Further, in FIG. 3B, the radius of a dye molecular aggregate is represented as r2, and the center-to-center distance of molecular aggregates is represented as d2. Provided that when the structures of the dyes are equal to each other, the intervals (p) of dye molecular aggregates are always constant, it is conjectured that when the size of the molecular aggregate formed by the dye increases from r1 to r2, the d-value measured by the small-angle X-ray scattering method increases from d1 to d2. Consequently, it is considered that the d-value measured by the small-angle X-ray scattering method is the indicator that indicates the size of the dye molecular aggregate. A larger d-value indicates that the dye molecular aggregate is large. Therefore, the aggregation tendency of the dye is enhanced.

Meanwhile, the peak of the profile indicates that the X-ray scattering intensity changes in accordance with the 2θ value and, therefore, indicates the distribution of d-values of dye molecular aggregates because the d-value is determined from the 2θ value. The area between the peak and the base line on which the X-ray scattering intensity is 0 is the peak area. Since a larger peak area indicates that a larger amount of dye molecular aggregates are present, and, therefore, the aggregation tendency of the dye is enhanced. Since not only the d-value but also the peak area are adopted as the indicators of the aggregation tendency, the aggregation tendency of the dye can be more accurately determined from the two viewpoints of the size of the dye molecular aggregate and the amount of the dye molecular aggregates.

The dye has a d-value of preferably 6.1 nm or more. The dye has a d-value of further preferably 7.8 nm or less. In addition, the ratio is preferably 2.4 times or more and more preferably 3.4 times or more. The ratio is further preferably 5.9 times or less.

Preferably, the dye having a d-value of 5.9 nm or more and having a ratio of 1.1 times or more is at least one selected from a group consisting of C.I. Direct Blue 199, C.I. Direct Yellow 132, C.I. Acid Red 289, a compound represented by general formula (1) below, a compound represented by general formula (2) below, a compound represented by general formula (3) below, a compound represented by general formula (4) below, a compound represented by general formula (5) below, and a compound represented by general formula (6) below.

[Chem. 1]

General formula (1)

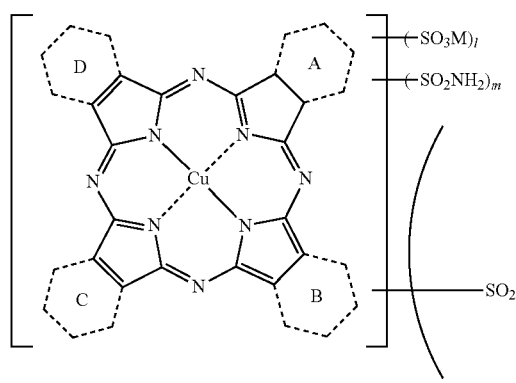

In general formula (1), each of rings A, B, C, and D indicated by broken lines independently represents an aromatic ring or a nitrogen-containing aromatic ring, R represents an amino group or an alkoxy group having a carbon number of 1 or more to 4 or less, each M independently represents a hydrogen atom, an alkali metal, ammonium, or organic ammonium, 1 represents 0 or more to 2 or less, m represents 1 or more to 3 or less, n represents 1 or more to 3 or less, and the total of 1, m, and n is 2 or 3.

[Chem. 2]

General formula (2)

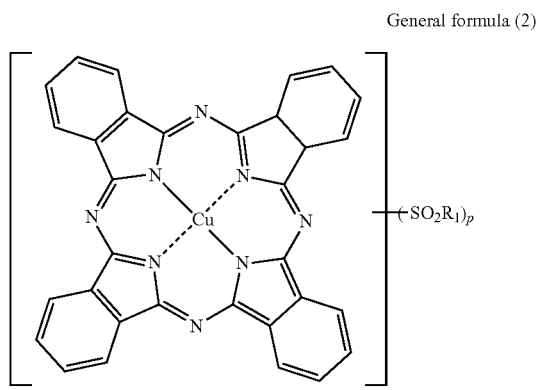

In general formula (2), each $R_1$ independently represents an alkyl group having a carbon number of 1 or more to 8 or less, the alkyl group may have a substituent that is an anionic group, a sulfonamide group, a hydroxy group, or a group in which at least two of these are combined, and p represents 3 or 4.

[Chem. 3]

General formula (3)

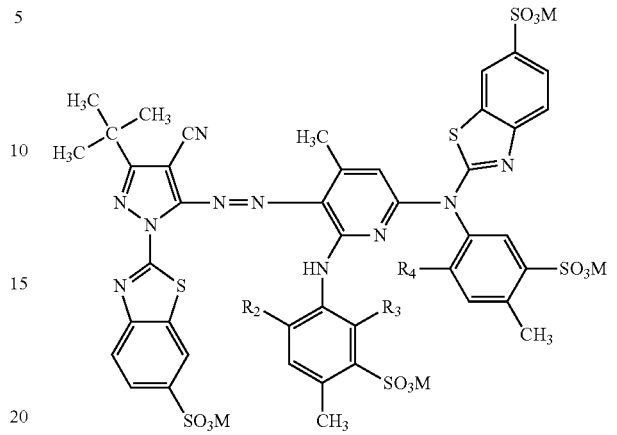

In general formula (3), each of $R_2$, $R_3$, $R_4$, and $R_5$ independently represents an alkyl group having a carbon number of 1 or more to 4 or less, and each M independently represents a hydrogen atom, an alkali metal, ammonium, or organic ammonium.

[Chem. 4]

General formula (4)

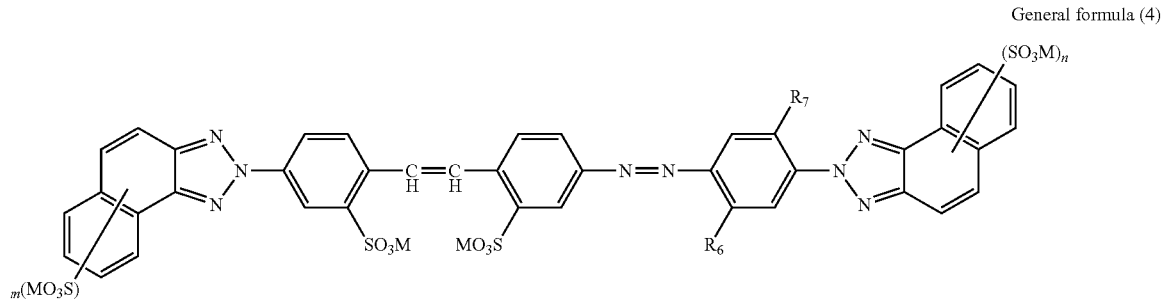

In general formula (4), each of $R_6$ and $R_7$ independently represents a hydrogen atom, an alkyl group, an acylamino group, an alkoxy group, a sulfonic acid group, a carboxylic acid group, or a ureido group, each M independently represents a hydrogen atom, an alkali metal, ammonium, or organic ammonium, and each of m and n independently represents 1 or 2.

[Chem. 5]

General formula (5)

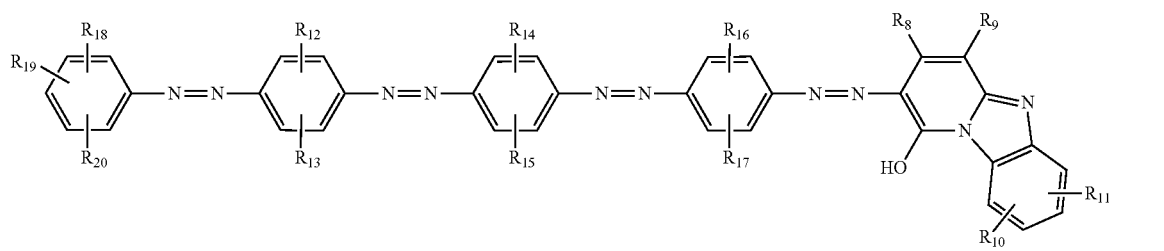

in general formula (5), $R_8$ represents an alkyl group having a carbon number of 1 or more to 4 or less; an alkyl group having a carbon number of 1 or more to 4 or less and having a carboxylic acid group as a substituent; a phenyl group; a phenyl group having a sulfonic acid group as a substituent; or a carboxylic acid group, $R_9$ represents a cyano group; a carbamoyl group; or a carboxylic acid group, each of $R_{10}$ and $R_{11}$ independently represents a hydrogen atom; an alkyl group having a carbon number of 1 or more to 4 or less; a halogen atom; an alkoxy group having a carbon number of 1 or more to 4 or less; or a sulfonic acid group, each of $R_{12}$ and $R_{14}$ independently represents an alkylthio group having a carbon number of 1 or more to 4 or less; or an alkylthio group having a carbon number of 1 or more to 4 or less and having at least one substituent selected from a group consisting of a hydroxy group, a sulfonic acid group, and a carboxylic acid group, each of $R_{13}$ and $R_{15}$ independently represents an alkylcarbonylamino group having a carbon number of 1 or more to 4 or less, each of $R_{16}$ and $R_{17}$ independently represents a hydrogen atom; a carboxylic acid group; a sulfonic acid group; an acetylamino group; a halogen atom; an alkyl group having a carbon number of 1 or more to 4 or less; an alkoxy group having a carbon number of 1 to 4; or an alkoxy group having a carbon number of 1 or more to 4 or less and having at least one substituent selected from a group consisting of a hydroxy group, an alkoxy group having a carbon number of 1 or more to 4 or less, a sulfonic acid group, and a carboxylic acid group, each of $R_{18}$, $R_{19}$, and $R_{20}$ independently represents a hydrogen atom; a carboxylic acid group; a sulfonic acid group, a hydroxy group; an acetylamino group; a halogen atom; a cyano group; a nitro group; a sulfamoyl group; an alkyl group having a carbon number of 1 or more to 4 or less; an alkoxy group having a carbon number of 1 or more to 4 or less; an alkoxy group having a carbon number of 1 or more to 4 or less and having at least one substituent selected from a group consisting of a hydroxy group, an alkoxy group having a carbon number of 1 or more to 4 or less, a sulfonic acid group, and a carboxylic acid group; an alkylsulfonyl group having a carbon number of 1 to 4; or an alkylsulfonyl group having a carbon number of 1 or more to 4 or less and having at least one substituent selected from a group consisting of a hydroxy group, a sulfonic acid group, and a carboxylic acid group.

[Chem. 6]

General formula (6)

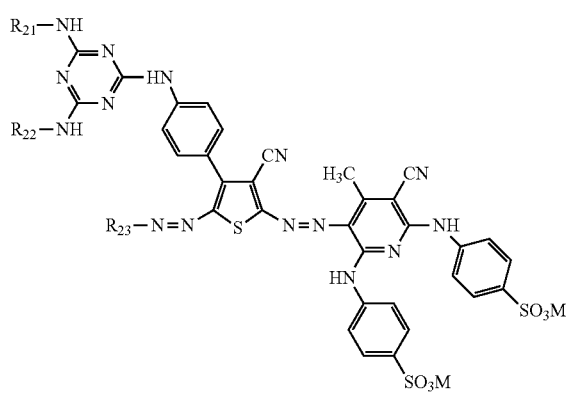

in general formula (6), each of $R_{21}$ and $R_{22}$ independently represents an alkyl group having a carbon number of 1 or more to 4 or less or an aryl group and those may have an anionic group as a substituent, $R_{23}$ represents an aryl group that may have a cyano group or an anionic group as a substituent, and each M independently represents a hydrogen atom, an alkali metal, ammonium, or organic ammonium.

The ratio (times) per unit area of the recording medium of the amount of the dye applied ($g/m^2$) to the amount of the silver particles applied per unit area of the recording medium ($g/m^2$) is preferably 0.2 times or more. If the ratio is less than 0.2 times, the amount of the dye is excessively small relative to silver particles, and the color developability of the image is not limited to be sufficiently realized. The ratio is further preferably 0.7 times or less. The amount of the dye or the silver particles applied per unit area of the recording medium ($g/m^2$) may be adjusted by changing the content of dye or silver particles in the ink or changing the recording duty of each ink.

Aqueous Medium

The second ink is an aqueous ink containing water as an aqueous medium. The aqueous medium may further contain a water-soluble organic solvent. Preferably, deionized water (ion-exchanged water) is used as the water. There is no particular limitation regarding the water-soluble organic solvent, and any of alcohols, glycols, alkylene glycols, polyethylene glycols, nitrogen-containing compounds, sulfur-containing compounds, and the like that can be used for an ink-jet ink may be used. In this regard, at least one of these water-soluble organic solvents may be contained in the ink.

The content (% by mass) of the water in the second ink is preferably 50.0% by mass or more to 95.0% by mass or less relative to the total mass of the ink. Meanwhile, the content (% by mass) of the water-soluble organic solvent in the second ink is preferably 3.0% by mass or more to 50.0% by mass or less relative to the total mass of the second ink. If the content of the water-soluble organic solvent is less than 3.0% by mass, when the ink is used for an ink jet recording apparatus, the reliability, for example, sticking resistance, is not limited to be realized. Meanwhile, if the content of the water-soluble organic solvent is more than 50.0% by mass, poor supply of the ink may occur.

Other Components

The second ink may contain water-soluble organic solvents that are solid at normal temperature (temperature of 25° C.), for example, urea or derivatives thereof, trimethylol propane, and trimethylol ethane, in addition to the above-described components. Further, the ink may contain various additives, for example, a surfactant, a resin, a pH adjuster, a defoaming agent, a rust inhibitor, a preservative, a fungicide, an antioxidant, a reducing inhibitor, and a chelating agent, as the situation demands.

Physical Properties of Second Ink

The viscosity (mPa·s) at a temperature of 25° C. of the second ink is preferably 1 mPa·s or more to 5 mPa·s or less and further preferably 1 mPa·s or more to 3 mPa·s or less. In addition, the surface tension (mN/m) at a temperature of 25° C. of the second ink is preferably 10 mN/m or more to 60 mN/m or less, more preferably 20 mN/m or more to 60 mN/m or less, and further preferably 30 mN/m or more to 40 mN/m or less. The surface tension of the second ink may be adjusted by appropriately determining the type and the content of the surfactant in the second ink.

EXAMPLES

The present invention will be described below in further detail with reference to the examples and the comparative examples, although the present invention is not limited to the examples described below within the bounds of not departing from the gist of the present invention. In this regard, the amount of the component expressed in "part" or "%" is on a mass basis, unless otherwise specified.

Preparation of Silver Particle Dispersion Liquid

Silver particle dispersion liquid A (silver particle content of 20.0% and resin content of 2.0%) was obtained according to a preparation method described in example 2 of International Publication No. 2008/049519. Further, silver particle dispersion liquid B (silver particle content of 20.0% and surfactant content of 2.0%) was obtained according to a preparation method described in example 2-2 of Japanese Patent Laid-Open No. 2004-285106.

Preparation of First Ink

A first ink was prepared by mixing components shown in Table 1, performing stirring sufficiently, and performing pressure filtration by using a filter having a pore size of 1.2 μm. Acetylenol E100 was a nonionic surfactant produced by Kawaken Fine Chemicals Co., Ltd. Acetylenol E100 had an HLB value determined by the Griffin method of 13. In the table, Compound 1 is a dye, and the detailed structure is described in "Preparation of dye".

Preparation of second ink
Preparation of dye

The following compounds were prepared. The structural formula is expressed as a free acid type.

Compound 1: a sodium salt of a compound that is represented by formula (1) below and that is synthesized according to the description of International Publication No. 2007/091631

Compound 2: a lithium salt of a compound that is represented by formula (2) below and that is synthesized according to the description of Japanese Patent Laid-Open No. 2003-231834

Compound 3: a lithium salt of a compound that is represented by formula (3) below and that is synthesized according to the description of Japanese Patent Laid-Open No. 2006-143989

Compound 4: C.I. Direct Blue 199
Compound 5: C.I. Direct Yellow 132
Compound 6: C.I. Acid Red 289

Compound 7: a sodium salt of a compound that is represented by formula (4) below and that is synthesized according to the description of Japanese Patent Laid-Open No. 2003-321627

Compound 8: a mixture of a lithium salt (80% by mole) and a sodium salt (20% by mole) of a compound that is represented by formula (5) below and that is synthesized according to the description of International Publication No. 2012/081640

Compound 9: a mixture of a lithium salt (80% by mole) and a sodium salt (20% by mole) of a compound that is represented by formula (6) below and that is synthesized according to the description of International Publication No. 2012/014954

Comparative compound 1: a potassium salt of a compound that is represented by formula (7) below and that is synthesized according to the description of International Publication No. 2006/082669

Comparative compound 2: C.I. Acid Blue 9

Comparative compound 3: a sodium salt of a compound that is represented by formula (8) below and that is synthesized according to the description of Japanese Patent Laid-Open No. 10-306221

Comparative compound 4: a lithium salt of a compound that is represented by formula (9) below and that is synthesized according to the description of Japanese Patent Laid-Open No. 2005-139427

TABLE 1

| Table 1: Composition of first ink | | | | | | | |
|---|---|---|---|---|---|---|---|
| | First ink No. | | | | | | |
| | 1 | 2 | 3 | 4 | 5 | 6 | 7 |
| Silver particle dispersion liquid A | 25.0 | 25.0 | | 25.0 | 25.0 | 25.0 | 25.0 |
| Silver particle dispersion liquid B | | | 25.0 | | | | |
| Ethylene glycol | 20.0 | | | | | | 20.0 |
| Sorbitol | | 20.0 | 20.0 | | | | |
| Trimethylol propane | | | | 20.0 | | | |
| Xylitol | | | | | 20.0 | | |
| D-Glucose | | | | | | 20.0 | |
| Acetylenol E100 | 0.2 | 0.2 | 0.2 | 0.2 | 0.2 | 0.2 | 0.2 |
| Compound 1 | | | | | | | 5.0 |
| Ion-exchanged water | 54.8 | 54.8 | 54.8 | 54.8 | 54.8 | 54.8 | 49.8 |

Comparative compound 5: C.I. Acid Red 249
[Chem. 7]
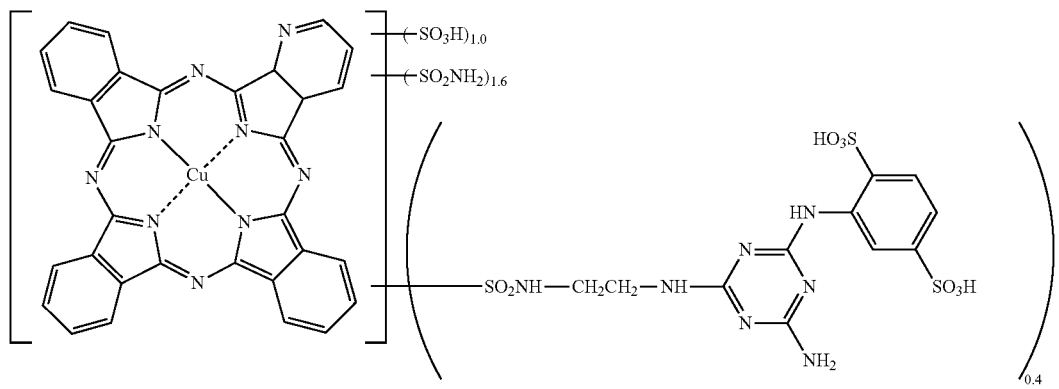
Formula (1)
[Chem. 8]
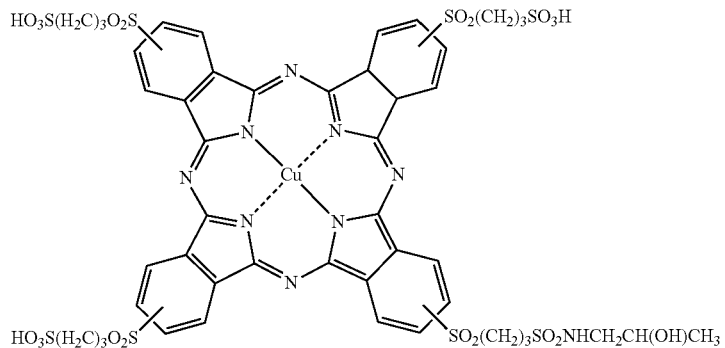
Formula (2)
[Chem. 9]
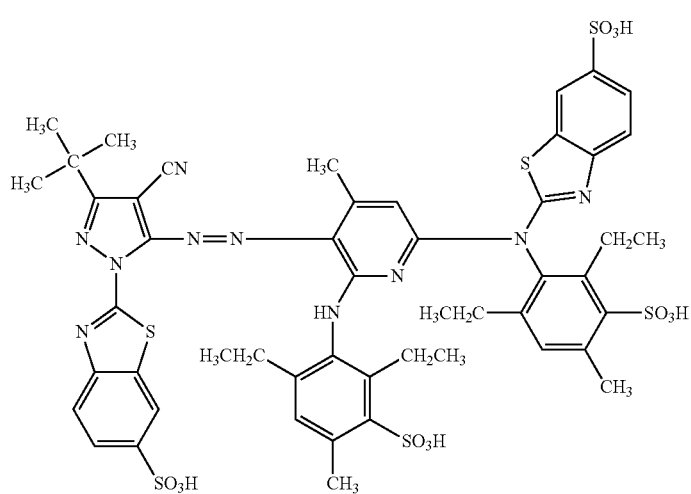
Formula (3)

-continued
Formula (4)
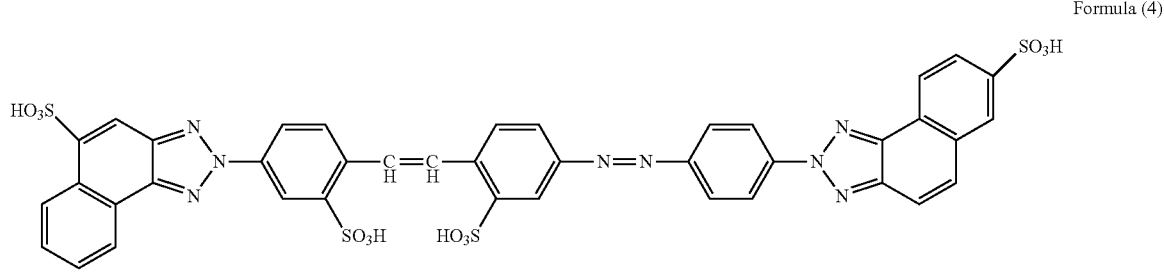
Formula (5)
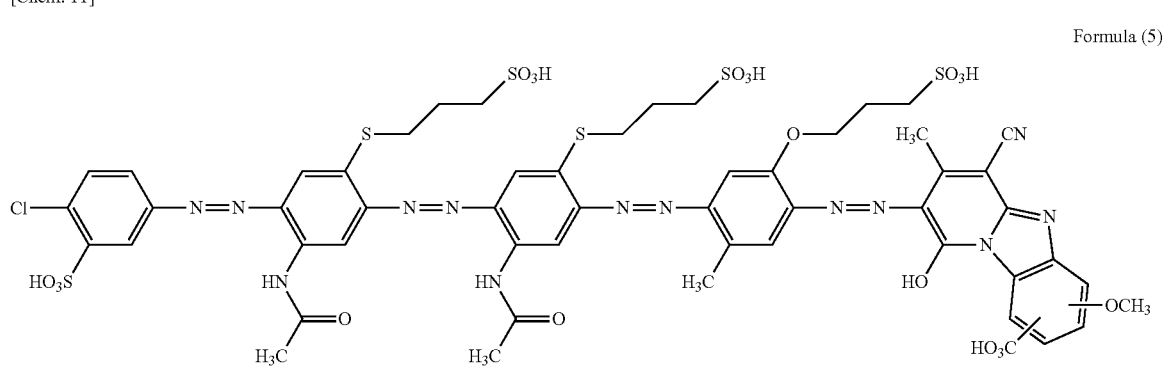
Formula (6)
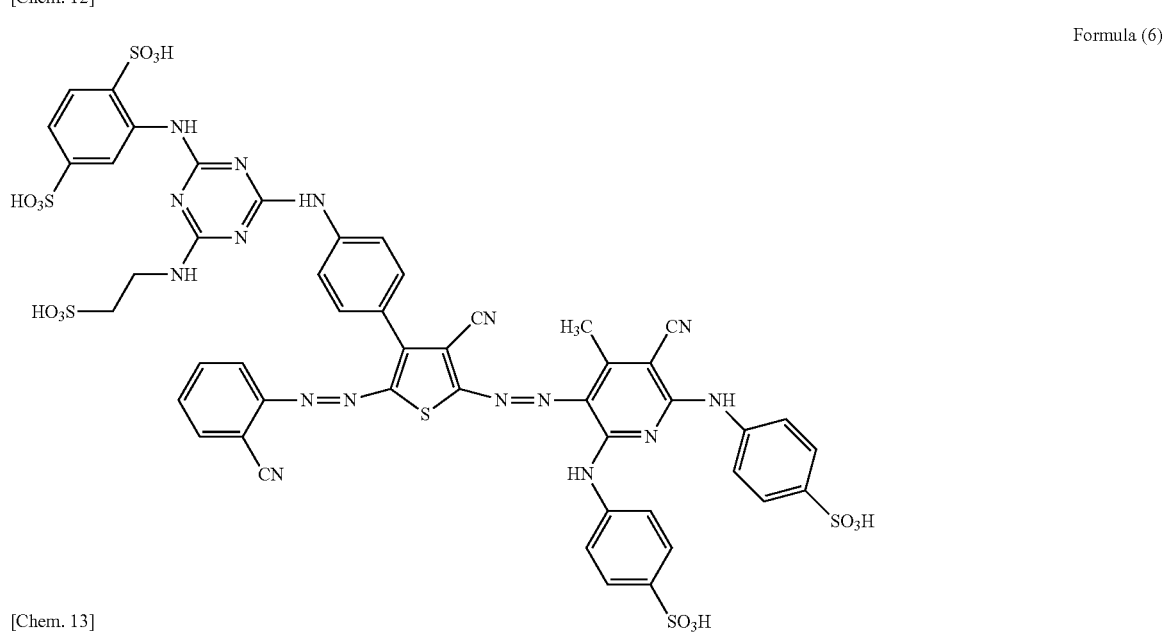
Formula (7)
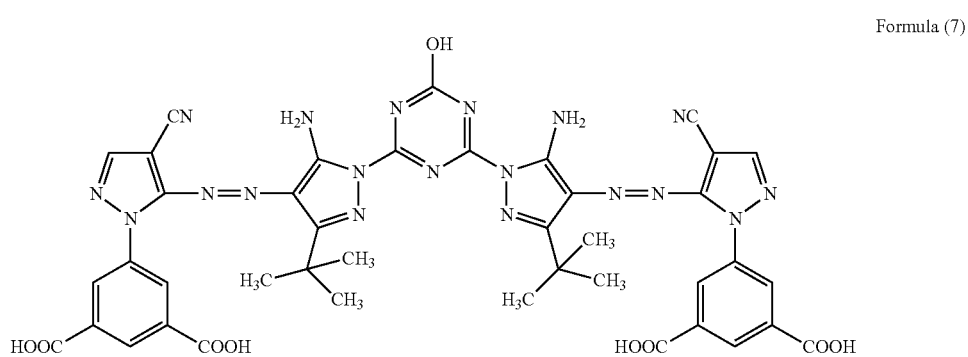

[Chem. 14]

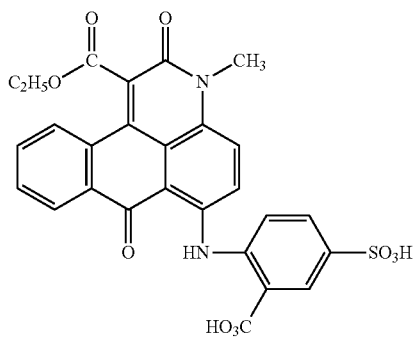

Formula (8)

[Chem. 15]

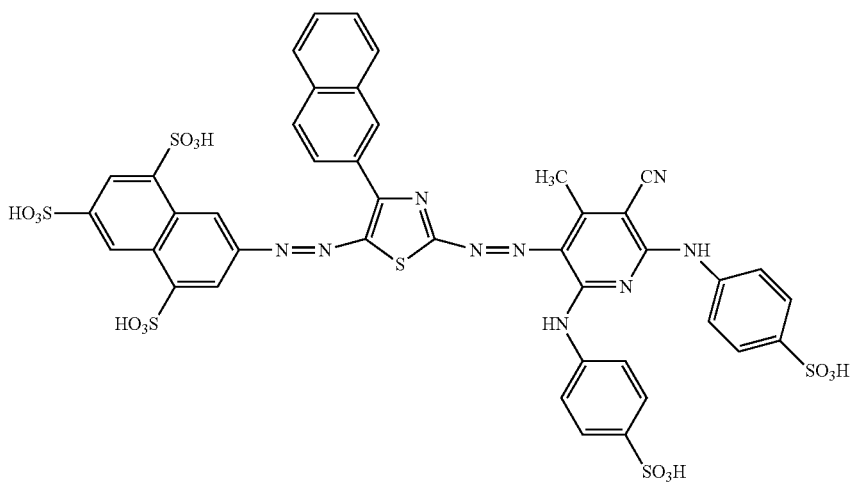

Formula (9)

D-Value and Peak Area of Dye

Each of liquids containing 5.0% by mass of the respective dyes was used, and the scattering angle profile was measured by the small-angle X-ray scattering method. The measurement conditions for the scattering angle profile are as described below.

Apparatus: small-angle X-ray scattering system Nano Viewer produced by Rigaku Corporation
X-ray sauce: Cu
Output: 45 kV-60 mA
Camera length: 446 mm
Size of first slit: 0.20 mm
Size of second slit: 0.10 mm
Size of third slit: 0.25 mm
Irradiation time: 120 min
Beam stopper: 2.0 mmφ
Measuring method: permeation method
Detector: PILATUS The resulting two-dimensional data were converted to a one-dimensional profile by exploiting circular average. The background was formed by employing a Spline function and was subtracted from the measured value. A peak and the integral were calculated by using analysis software Origin so as to obtain a scattering angle profile. The 2θ value was measured from the peak top in the resulting scattering angle profile. The intermolecular distance d-value was calculated on the basis of the Bragg equation ($2 d \sin \theta = n\lambda$, λ: X-ray wavelength, d: distance between particles, and θ: scattering angle) from the obtained 2θ value and is described in Table 2.

Further, the peak area obtained by measurement and the peak area ratio relative to C.I. Acid Red 249 serving as the reference are described in Table 2. In Table 2, the intermolecular distance d-value is expressed as "d-Value (nm)", the peak area obtained by measurement is expressed as "Peak area", the peak area ratio relative to C.I. Acid Red 249 is expressed as "Peak area ratio (times)".

TABLE 2

| Characteristics of dye | | | |
| --- | --- | --- | --- |
| | d-Value (nm) | Peak area | Peak area ratio (times) |
| Compound 1 | 6.9 | 8.0 | 4.7 |
| Compound 2 | 7.2 | 10.2 | 5.9 |
| Compound 3 | 5.9 | 2.1 | 1.2 |
| Compound 4 | 6.1 | 5.8 | 3.4 |
| Compound 5 | 6.9 | 1.8 | 1.1 |
| Compound 6 | 7.4 | 2.4 | 1.4 |
| Compound 7 | 7.4 | 4.1 | 2.4 |
| Compound 8 | 7.4 | 7.0 | 4.1 |
| Compound 9 | 7.8 | 6.9 | 4.0 |
| Comparative compound 1 | 4.0 | 1.1 | 0.6 |
| Comparative compound 2 | 4.3 | 0.7 | 0.4 |
| Comparative compound 3 | 4.6 | 1.5 | 0.9 |
| Comparative compound 4 | 5.8 | 4.8 | 2.8 |
| Comparative compound 5 | 5.4 | 1.7 | 1.0 |

In addition, comparative compound 6 represented by formula (10) below and comparative compound 7 represented by formula (11) below were prepared.

[Chem. 16]

Formula (10)

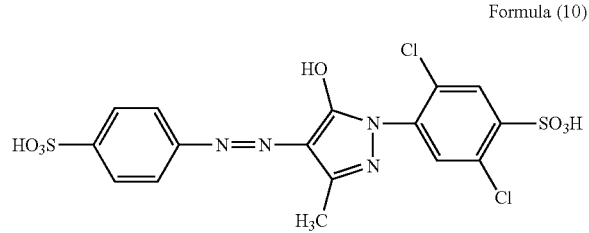

[Chem. 17]

Formula (11)

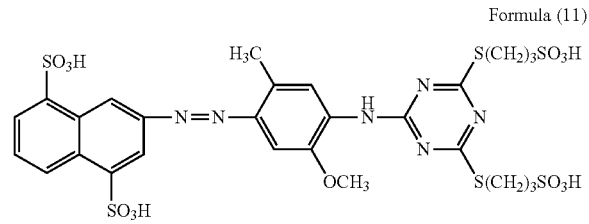

Second Ink

A second ink was prepared by mixing components shown in Table 3, performing stirring sufficiently, and performing pressure filtration by using a filter having a pore size of 1.2 μm. Acetylenol E100 was a nonionic surfactant produced by Kawaken Fine Chemicals Co., Ltd.

recording apparatuses (PIXUS MG3630 produced by CANON KABUSHIKI KAISHA) including a recording head that ejected an ink by the action of thermal energy. Regarding the recording head, a recording head including a first ink ejection orifice line and a second ink ejection orifice line arranged in the direction orthogonal to the main scanning direction was used as the recording head. In the present example, regarding the first ink, an image recorded under the condition in which 2 ink droplets of about 11.2 ng each, were applied to a unit region of 1/600 inch×1/600 inch was defined as an image with a recording duty of 100%. Regarding the second ink, an image recorded under the condition in which 2 ink droplets of about 5.7 ng each, were applied to a unit region of 1/600 inch×1/600 inch was defined as an image with a recording duty of 100%. The above-described ink jet recording apparatus was used, the first ink was recorded by using an upstream-side half of the ejection orifice line in the sub-scanning direction, and the second ink was recorded by using a downstream-side half of the ejection orifice line in the sub-scanning direction. To apply the first ink and the second ink with a predetermined time difference in every unit region of the recording medium, the setting of the apparatus was adjusted such that the image was recorded in one direction rather than both directions for the sake of convenience. After the first ink was applied from the upstream-side ejection orifice line, the recording medium was conveyed by the length of the region provided with the first ink, while the carriage was returned to the home position. Subsequently, the second ink was applied from the downstream-side ejection orifice line so as to be overlaid on the region provided with the first ink. The time difference between applications of the first ink and the second ink was

TABLE 3

Table 3: Composition of second ink

| | Second ink No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Compound 1 | 5.0 | | | | | | | | | | | | | | |
| Compound 2 | | | | | | | | | | 5.0 | | | | | |
| Compound 3 | | 5.0 | | | | | | | | | | | | | |
| Compound 4 | | | 5.0 | | | | | | | | | | | | |
| Compound 5 | | | | 5.0 | | | | | | | | | | | |
| Compound 6 | | | | | 5.0 | | | | | | | | | | |
| Compound 7 | | | | | | 5.0 | | | | | | | | | |
| Compound 8 | | | | | | | 5.0 | | | | | | | | |
| Compound 9 | | | | | | | | 5.0 | | | | | | | |
| Comparative compound 1 | | | | | | | | | 5.0 | | | | | | |
| Comparative compound 2 | | | | | | | | | | | 5.0 | | | | |
| Comparative compound 3 | | | | | | | | | | | | 5.0 | | | |
| Comparative compound 4 | | | | | | | | | | | | | 5.0 | | |
| Comparative compound 5 | | | | | | | | | | | | | | 5.0 | |
| Comparative compound 6 | | | | | | | | | | | | | | | 2.5 |
| Comparative compound 7 | | | | | | | | | | | | | | | 2.5 |
| Glycerin | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion-exchanged water | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 |

Each ink cartridge was filled with the first ink or the second ink described in Table 4 and set into an ink jet adjusted by adjusting the time required for returning the carriage to the home position. By the above-described method, the first ink was applied with the recording duty described in Table 4, and after the time difference described in Table 4, the second ink was applied with the recording duty described in Table 4. Regarding the recording medium, glossy paper (CANON Photo Paper • Pro Platinum; produced by CANON KABUSHIKI KAISHA) was used. In the present invention, AAA, AA, A or B in the following evaluation criteria of each evaluation was assumed to be an acceptable level, and C was assumed to be an unacceptable level. The evaluation results are described in Table 4.

TABLE 4

Table 4: Evaluation result

| | Evaluation condition | | | | | |
|---|---|---|---|---|---|---|
| | Earlier application | | Later application | | Time difference of applications (sec) | Amount of dye applied (g/m$^2$) |
| | Ink species | Recording duty (%) | Ink species | Recording duty (%) | | |
| Example 1 | First ink 1 | 100 | Second ink 1 | 100 | 120 | 0.3 |
| Example 2 | First ink 2 | 100 | Second ink 1 | 100 | 120 | 0.3 |
| Example 3 | First ink 3 | 100 | Second ink 1 | 100 | 120 | 0.3 |
| Example 4 | First ink 2 | 100 | Second ink 3 | 100 | 120 | 0.3 |
| Example 5 | First ink 2 | 100 | Second ink 8 | 100 | 120 | 0.3 |
| Example 6 | First ink 1 | 100 | Second ink 1 | 100 | 1 | 0.3 |
| Example 7 | First ink 1 | 100 | Second ink 1 | 100 | 7200 | 0.3 |
| Example 8 | First ink 1 | 100 | Second ink 2 | 100 | 120 | 0.3 |
| Example 9 | First ink 1 | 100 | Second ink 3 | 100 | 120 | 0.3 |
| Example 10 | First ink 1 | 100 | Second ink 4 | 100 | 120 | 0.3 |
| Example 11 | First ink 1 | 100 | Second ink 5 | 100 | 120 | 0.3 |
| Example 12 | First ink 1 | 100 | Second ink 6 | 100 | 120 | 0.3 |
| Example 13 | First ink 1 | 100 | Second ink 7 | 100 | 120 | 0.3 |
| Example 14 | First ink 1 | 100 | Second ink 8 | 100 | 120 | 0.3 |
| Example 15 | First ink 1 | 100 | Second ink 9 | 100 | 120 | 0.3 |
| Example 16 | First ink 4 | 100 | Second ink 3 | 100 | 120 | 0.3 |
| Example 17 | First ink 5 | 100 | Second ink 3 | 100 | 120 | 0.3 |
| Example 18 | First ink 6 | 100 | Second ink 3 | 100 | 120 | 0.3 |
| Example 19 | First ink 1 | 100 | Second ink 1 | 20 | 120 | 0.07 |
| Example 20 | First ink 1 | 100 | Second ink 1 | 40 | 120 | 0.1 |
| Example 21 | First ink 1 | 100 | Second ink 1 | 125 | 120 | 0.4 |
| Example 22 | First ink 1 | 100 | Second ink 2 | 20 | 120 | 0.07 |
| Comparative example 1 | Second ink 1 | 100 | First ink 1 | 100 | 120 | 0.3 |
| Comparative example 2 | First ink 1 | 100 | Second ink 15 | 100 | 120 | 0.3 |
| Comparative example 3 | First ink 7 | 100 | — | — | 0 | 0.0 |
| Comparative example 4 | First ink 1 | 100 | Second ink 1 | 100 | 0.5 | 0.3 |
| Comparative example 5 | First ink 1 | 100 | Second ink 1 | 100 | 8000 | 0.3 |
| Comparative example 6 | First ink 1 | 100 | Second ink 10 | 100 | 120 | 0.3 |
| Comparative example 7 | First ink 1 | 100 | Second ink 11 | 100 | 120 | 0.3 |
| Comparative example 8 | First ink 1 | 100 | Second ink 12 | 100 | 120 | 0.3 |
| Comparative example 9 | First ink 1 | 100 | Second ink 13 | 100 | 120 | 0.3 |
| Comparative example 10 | First ink 1 | 100 | Second ink 14 | 100 | 120 | 0.3 |

| | Evaluation condition | | Evaluation result | |
|---|---|---|---|---|
| | Amount of silver particles applied (g/m$^2$) | (Amount of dye applied)/(amount of silver particles applied) (times) | Color developability | Glossiness |
| Example 1 | 0.6 | 0.5 | AA | A |
| Example 2 | 0.6 | 0.5 | AAA | A |
| Example 3 | 0.6 | 0.5 | AAA | A |
| Example 4 | 0.6 | 0.5 | AAA | A |
| Example 5 | 0.6 | 0.5 | AAA | A |
| Example 6 | 0.6 | 0.5 | AA | A |
| Example 7 | 0.6 | 0.5 | AA | A |
| Example 8 | 0.6 | 0.5 | B | A |
| Example 9 | 0.6 | 0.5 | AA | A |
| Example 10 | 0.6 | 0.5 | B | A |
| Example 11 | 0.6 | 0.5 | B | A |
| Example 12 | 0.6 | 0.5 | A | A |
| Example 13 | 0.6 | 0.5 | AA | A |
| Example 14 | 0.6 | 0.5 | AA | A |
| Example 15 | 0.6 | 0.5 | AA | A |
| Example 16 | 0.6 | 0.5 | AA | A |
| Example 17 | 0.6 | 0.5 | AAA | A |
| Example 18 | 0.6 | 0.5 | A | A |
| Example 19 | 0.6 | 0.1 | A | A |
| Example 20 | 0.6 | 0.2 | AA | A |
| Example 21 | 0.6 | 0.7 | AA | A |
| Example 22 | 0.6 | 0.1 | B | A |

TABLE 4-continued

Table 4: Evaluation result

| Comparative example 1 | 0.6 | 0.5 | C | A |
| Comparative example 2 | 0.6 | 0.5 | C | A |
| Comparative example 3 | 0.6 | 0.0 | AA | C |
| Comparative example 4 | 0.6 | 0.5 | AA | C |
| Comparative example 5 | 0.6 | 0.5 | C | A |
| Comparative example 6 | 0.6 | 0.5 | C | A |
| Comparative example 7 | 0.6 | 0.5 | C | A |
| Comparative example 8 | 0.6 | 0.5 | C | A |
| Comparative example 9 | 0.6 | 0.5 | C | A |
| Comparative example 10 | 0.6 | 0.5 | C | A |

Color Developability of Image

The color developability was evaluated by performing a measurement as described below where an SCI system including regular reflection light was employed by using an integrating sphere colorimeter CM-2600d (produced by KONICA MINOLTA, INC.). Only the first ink containing silver particles was used, and $L^*$, $a_0^*$, and $b_0^*$ of an image recorded with a recording duty of 100% were measured. The ink containing silver particles and the ink containing the dye were used, and $L_1^*$, $a_1^*$, and $b_1^*$ of an image recorded with a recording duty of 100% each were measured. These values were used, and the color difference $\Delta E_{Lab}$ was calculated by using a formula $\Delta E_{Lab} = \{(L_1^* - L_0^*)^2 + (a_1^* - a_0^*)^2 + (b_1^* - b_0^*)^2\}^{1/2}$. In this regard, $L^*$, $a^*$, and $b^*$ refer to values in the $L^*a^*b^*$ display system specified by CIE (Commission Internationale de l'eclairage). When $\Delta E_{Lab}$ was 12 or more, regarding an image produced, the color tone of the dye used rather than silver was observed.

AAA: $\Delta E_{Lab}$ was 40 or more
AA: $\Delta E_{Lab}$ was 25 or more to less than 40
A: $\Delta E_{Lab}$ was 20 or more to less than 25
B: $\Delta E_{Lab}$ was 12 or more to less than 20
C: $\Delta E_{Lab}$ was less than 12

Glossiness of Image

Regarding the image obtained, specular glossiness at an angle of 20° was measured by using Surface Reflectance Analyzer RA-532H (produced by CANON KABUSHIKI KAISHA), and evaluation was performed on the basis of the evaluation criteria described below. In the case in which the specular glossiness at an angle of 20° was 100 or more, glossy appearance was visually recognized.

A: the glossiness of the image was 100 or more
C: the glossiness of the image was less than 100

The present invention is not limited to the above-described embodiments and can be variously changed and modified without departing from the spirit and scope of the present invention. Therefore, to apprise the public of the scope of the present invention, the following claims are appended.

According to the present invention, an ink jet recording method and an ink jet recording apparatus which are excellent in image glossiness and color developability can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An ink jet recording method comprising the steps of:
   a first step for applying a first ink to a recording medium; and
   a second step for applying a second ink to the recording medium so as to overlap at least a region provided with the first ink,
   wherein the first ink is an aqueous ink comprising silver particles,
   the second ink is an aqueous ink comprising a dye,
   a time difference between applications of the first ink and the second ink to the recording medium is 1 sec or more to 7,200 sec or less, and
   the intermolecular distance d-value of the dye measured by a small-angle X-ray scattering method is 5.9 nm or more, and the ratio of the peak area to the peak area of C.I. Acid Red 249 is 1.1 times or more.

2. The ink jet recording method according to claim 1, wherein the d-value of the dye is 6.1 nm or more.

3. The ink jet recording method according to claim 1, wherein the ratio of the peak area of the dye to the peak area of C.I. Acid Red 249 is 2.4 times or more.

4. The ink jet recording method according to claim 1, wherein the ratio of the peak area of the dye to the peak area of C.I. Acid Red 249 is 3.4 times or more.

5. The ink jet recording method according to claim 1, wherein the dye is at least one selected from a group consisting of C.I. Direct Blue 199, C.I. Direct Yellow 132, C.I. Acid Red 289, a compound represented by general formula (1) below, a compound represented by general formula (2) below, a compound represented by general formula (3) below, a compound represented by general formula (4) below, a compound represented by general formula (5) below, and a compound represented by general formula (6) below,

[Chem. 1]

General formula (1)

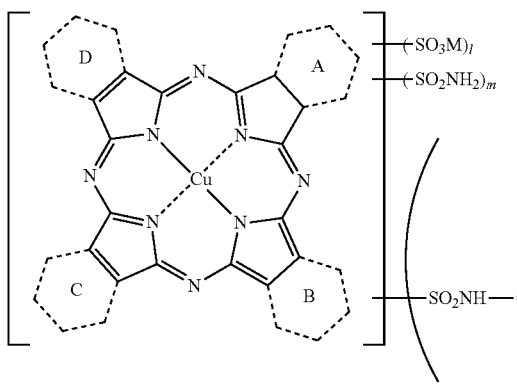
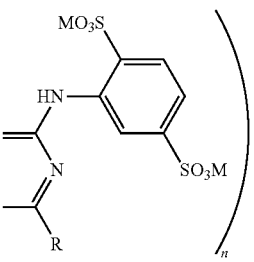

(in general formula (1), each of rings A, B, C, and D indicated by broken lines independently represents an aromatic ring or a nitrogen-containing aromatic ring, R represents an amino group or an alkoxy group having a carbon number of 1 or more to 4 or less, each M independently represents a hydrogen atom, an alkali metal, ammonium, or organic ammonium, l represents 0 or more to 2 or less, m represents 1 or more to 3 or less, n represents 1 or more to 3 or less, and the total of l, m, and n is 2 or 3)

[Chem. 2]

General formula (2)

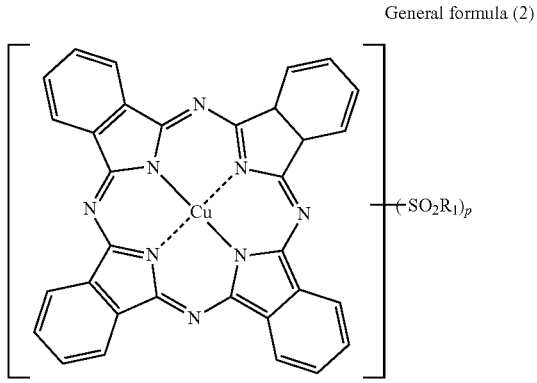

(in general formula (2), each $R_1$ independently represents an alkyl group having a carbon number of 1 or more to 8 or less, the alkyl group may have a substituent that is an anionic group, a sulfonamide group, a hydroxy group, or a group in which at least two of these are combined, and p represents 3 or 4)

[Chem. 3]

General formula (3)

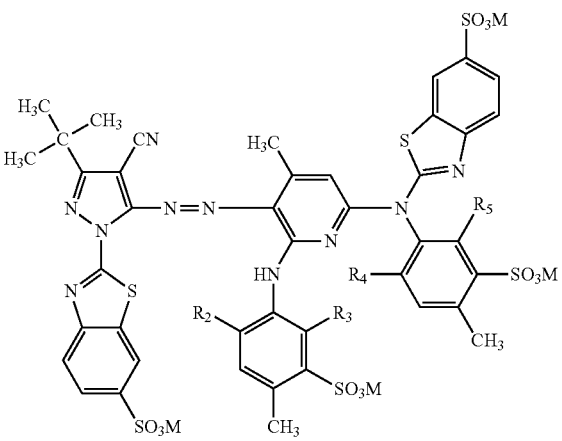

(in general formula (3), each of $R_2$, $R_3$, $R_4$, and $R_5$ independently represents an alkyl group having a carbon number of 1 or more to 4 or less, and each M independently represents a hydrogen atom, an alkali metal, ammonium, or organic ammonium)

[Chem. 4]

General formula (4)

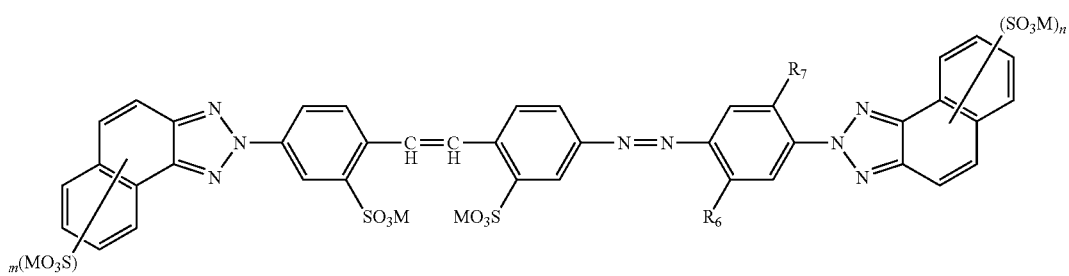

(in general formula (4), each of $R_6$ and $R_7$ independently represents a hydrogen atom, an alkyl group, an acylamino group, an alkoxy group, a sulfonic acid group, a carboxylic acid group, or a ureido group, each M independently represents a hydrogen atom, an alkali metal, ammonium, or organic ammonium, and each of m and n independently represents 1 or 2)

[Chem. 5]

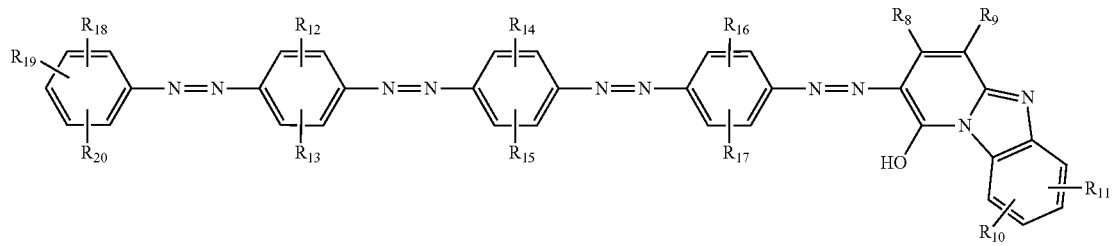

General formula (5)

(in general formula (5), $R_8$ represents an alkyl group having a carbon number of 1 or more to 4 or less; an alkyl group having a carbon number of 1 or more to 4 or less and having a carboxylic acid group as a substituent; a phenyl group; a phenyl group having a sulfonic acid group as a substituent; or a carboxylic acid group, $R_9$ represents a cyano group; a carbamoyl group; or a carboxylic acid group, each of $R_{10}$ and $R_{11}$ independently represents a hydrogen atom; an alkyl group having a carbon number of 1 or more to 4 or less; a halogen atom; an alkoxy group having a carbon number of 1 or more to 4 or less; or a sulfonic acid group, each of $R_{12}$ and $R_{14}$ independently represents an alkylthio group having a carbon number of 1 or more to 4 or less; or an alkylthio group having a carbon number of 1 or more to 4 or less and having at least one substituent selected from a group consisting of a hydroxy group, a sulfonic acid group, and a carboxylic acid group, each of $R_{13}$ and $R_{15}$ independently represents an alkylcarbonylamino group having a carbon number of 1 or more to 4 or less, each of $R_{16}$ and $R_{17}$ independently represents a hydrogen atom; a carboxylic acid group; a sulfonic acid group; an acetylamino group; a halogen atom; an alkyl group having a carbon number of 1 or more to 4 or less; an alkoxy group having a carbon number of 1 to 4; or an alkoxy group having a carbon number of 1 or more to 4 or less and having at least one substituent selected from a group consisting of a hydroxy group, an alkoxy group having a carbon number of 1 or more to 4 or less, a sulfonic acid group, and a carboxylic acid group, each of $R_{18}$, $R_{19}$, and $R_{20}$ independently represents a hydrogen atom; a carboxylic acid group; a sulfonic acid group, a hydroxy group; an acetylamino group; a halogen atom; a cyano group; a nitro group; a sulfamoyl group; an alkyl group having a carbon number of 1 or more to 4 or less; an alkoxy group having a carbon number of 1 or more to 4 or less; an alkoxy group having a carbon number of 1 or more to 4 or less and having at least one substituent selected from a group consisting of a hydroxy group, an alkoxy group having a carbon number of 1 or more to 4 or less, a sulfonic acid group, and a carboxylic acid group; an alkylsulfonyl group having a carbon number of 1 to 4; or an alkylsulfonyl group having a carbon number of 1 or more to 4 or less and having at least one substituent selected from a group consisting of a hydroxy group, a sulfonic acid group, and a carboxylic acid group)

[Chem. 6]

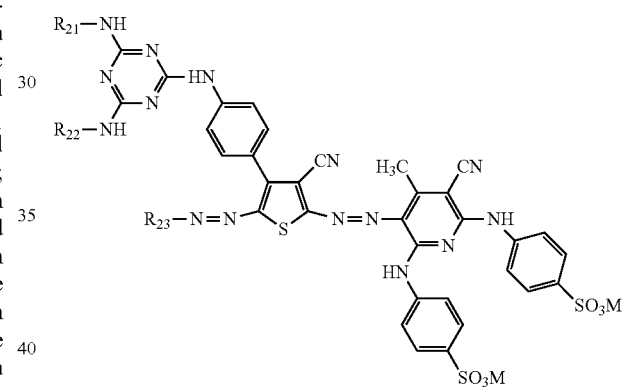

General formula (6)

(in general formula (6), each of $R_{21}$ and $R_{22}$ independently represents an alkyl group having a carbon number of 1 or more to 4 or less or an aryl group and those may have an anionic group as a substituent, $R_{23}$ represents an aryl group that may have a cyano group or an anionic group as a substituent, and each M independently represents a hydrogen atom, an alkali metal, ammonium, or organic ammonium).

6. The ink jet recording method according to claim 1, wherein the first ink comprises a polyhydric alcohol of trivalence or more to hexavalence or less.

7. The ink jet recording method according to claim 6, wherein the polyhydric alcohol is a pentahydric or hexahydric sugar alcohol.

8. The ink jet recording method according to claim 1, wherein the ratio (times) per unit area of the recording medium of the amount of the dye applied (g/m$^2$) to the amount of the silver particles applied (g/m$^2$) is 0.2 times or more to 0.7 times or less.

9. An ink jet recording apparatus comprising a device to apply a second ink after a first ink is applied,
wherein the first ink is an aqueous ink comprising silver particles,
the second ink is an aqueous ink comprising a dye, a time difference between applications of the first ink and the second ink to the recording medium is 1 sec or more to 7,200 sec or less, and the intermolecular distance d-value of the dye measured by a small-angle X-ray scattering method is 5.9 nm or more, and, in addition, the ratio of the peak area to the peak area of C.I. Acid Red 249 is 1.1 times or more.

* * * * *